United States Patent [19]

Martino

[11] Patent Number: 4,710,636
[45] Date of Patent: Dec. 1, 1987

[54] RETICLE PLATE HAVING A FLUORESCING PATTERN

[75] Inventor: Ronald J. Martino, Geneva, N.Y.

[73] Assignee: Bausch & Lomb Incorporated, Rochester, N.Y.

[21] Appl. No.: 646,666

[22] Filed: Aug. 31, 1984

[51] Int. Cl.$^4$ .............................................. F21K 2/00
[52] U.S. Cl. ................................................. 250/467.1
[58] Field of Search ................. 250/467.1, 463.1, 491.1

[56] References Cited

U.S. PATENT DOCUMENTS 2,392,979  1/1946  Douden ............................ 250/467.1
3,320,671  5/1967  Rickert et al. .................... 250/467.1

Primary Examiner—Bruce C. Anderson
Attorney, Agent, or Firm—John S. Norton

[57] ABSTRACT

In a reticle plate, a pattern is provided which contains a material that, when activated by a particular source of light, becomes highly visible in the field of view of the viewing instrument.

10 Claims, 4 Drawing Figures

RETICLE PLATE HAVING A FLUORESCING PATTERN

BACKGROUND OF THE INVENTION

1. Field of the Invention

This invention relates to reticles, and particularly, reticles incorporated in instruments utilized for stereoscopic viewing of, for instance, aerial photographs.

2. Description of the Prior Art

The sensation of depth results from the fact that a human has binocular vision and does not see exactly the same view of an object out of each eye. A photograph is essentially a monocular view of the object being examined and, accordingly, has no depth. However, by taking two pictures of the object with a camera which is moved slightly from a first position to a second position, two slightly different pictures of the object are obtained. By examining these two pictures with a device known as a stereoscope, each eye sees only one of the pictures and, therefore, the same sensation of depth is obtained as if the original object was viewed directly.

In a typical application, two photos of the same object, in either transparency or print form, are viewed with a stereoscope and certain characteristics of the photos are analyzed and interpreted, as for example to identify the size or heights of objects. The well known principle of parallax allows very accurate object height information to be extracted from the stereo photos, provided certain photo parameters are known, e.g. flying height, camera focal length, etc. Implementation of this principle requires that a reticle be positioned on conjugate image points on each photo of the stereo pair, i.e. identical image points on each photo. By moving one reticle along the flight line or direction of flight, the reticle mark (usually in the form of a circular dot) will appear to rise or lower above or below the three dimensional view provided by the stereo photographs. When the dot appears to be placed in contact with the object, it can be said the operator has cleared parallax about the object of interest. By measuring difference in parallax between the object in question and an adjacent point, the relative height of the object can be readily calculated. This operation is known in photogrammetry as clearing parallax by the floating mark technique.

A problem exists, however, when the usual and well known reticles are used in the parallax measuring process. As the reticle pattern is generally dark and/or opaque, it becomes quite difficult for the operator to quickly and easily find it in the field of view should the area of the photo under study be mostly dark, or populated with a plurality of dark objects. The reticle pattern blends in with the background. This is troublesome in instruments having a low power of magnification, such as 1× to 3×, where the reticle utilized generally comprises a dot of, perhaps, 0.5 mm in diameter. The problem is more severe in higher viewing magnifications since the actual reticle size is even smaller, and may be on the order of 0.01 mm to 0.02 mm in diameter. In these instances, dust which may have gathered on the photo will act to confuse the operator who must determine which among the field of dark and/or opaque dots on the photo is the actual reticle pattern.

The problem is further complicated, for instance, in instruments where the reticles are moved relative to the photograph. Accordingly, the reticle patterns are not generally centered in the field of view at the optical axis of the instrument. In fact, because the reticle is movable with respect to the photo, it would be most unlikely to be positioned at the center. Therefore, the operator must search the entire field of view to try and determine where the reticle pattern is actually located. This can be a most time consuming procedure resulting in considerable eye fatigue for the operator.

In an attempt to deal with the foregoing problems, some photogrammetric equipment manufacturers added arrows or other identifying marks to their reticles. The purpose of the arrow is to point to the location of the reticle pattern itself. However, this only aids the operator in determining the approximate position of the pattern. Also, the addition of the arrow introduces a new problem in that the arrow blocks adjacent portions of the photo.

Another attempt at solving the above described problems included painting the reticle pattern with a brightly colored non-fluorescing paint. However, this has not proven satisfactory either, as in order to make the color visible to the operator it is necessary to subject the reticle to illumination from above, so that the color of the reticle is reflected into the optics of the viewing instrument. Unfortunately, this illumination is also reflected into the optics of the viewer, thereby reducing image contrast and overall image quality. Further, the amount of light reflected from the reticle itself is small and the result is generally unsatisfactory because the reticle appears dark or, at least, dimly illuminated.

It will be appreciated from the foregoing description that there has been a long felt, but unsatisfied need in photogrammetry to provide a low cost, easily manufactured reticle pattern which is highly visible and easily recognizable by the operator in the field of view.

BRIEF SUMMARY OF INVENTION

The present invention, in a most utilitarian and economical manner, provides a solution to the problems described above. The invention comprises a reticle which has a reticle pattern treated with a material which becomes highly visible when activated by particular type or types of light. The illuminated and activated reticle pattern provides a reference source which is immediately recognizable to the instrument operator anywhere in the field of view. This is particularly useful in stereoplotting where it is necessary to move the reticle within the field of view, such as the case when constructing an elevation contour. The ease with which the reticle is recognized in the field of view of the photo being examined, therefore, aids the operator substantially and, in the case of opaque and/or dark objects, improves the accuracy of reticle position on the object.

The present invention also provides for a reticle which is illuminated to make the reticle pattern readily identifiable in the field of view of an optical instrument, yet undesirable light rays from the source of illumination are essentially prevented from entering the viewing optics of the instrument.

The present invention further provides for a reticle pattern which, in a first mode, may be activated so as to be readily visible. In a second and inactive mode, the reticle pattern would become opaque.

Still further, the present invention provides for a reticle which may be activated by a source of light which is remotely mounted with respect to the reticle itself.

This invention, while concerned mainly with involvements in the type of reticle utilized in the parallax clearing process, also applies to any reticle application in which a reticle is utilized generally at or in proximity to the film plane. The advantages of placing the reticle in the film plane, as opposed to other focal plane positions such as a relayed intermediate image plane or an eyepiece focal plane, is due to the fact that the shifting of optics, mirrors or mediums in the viewing instrument will not result in errors between the reticle and object plane since they are one and the same.

Further advantages and features of the present invention, as defined by the appended claims, will become readily apparent upon consideration of the following description and accompanying drawings.

DETAILED DESCRIPTION OF THE INVENTION

Figure 1:
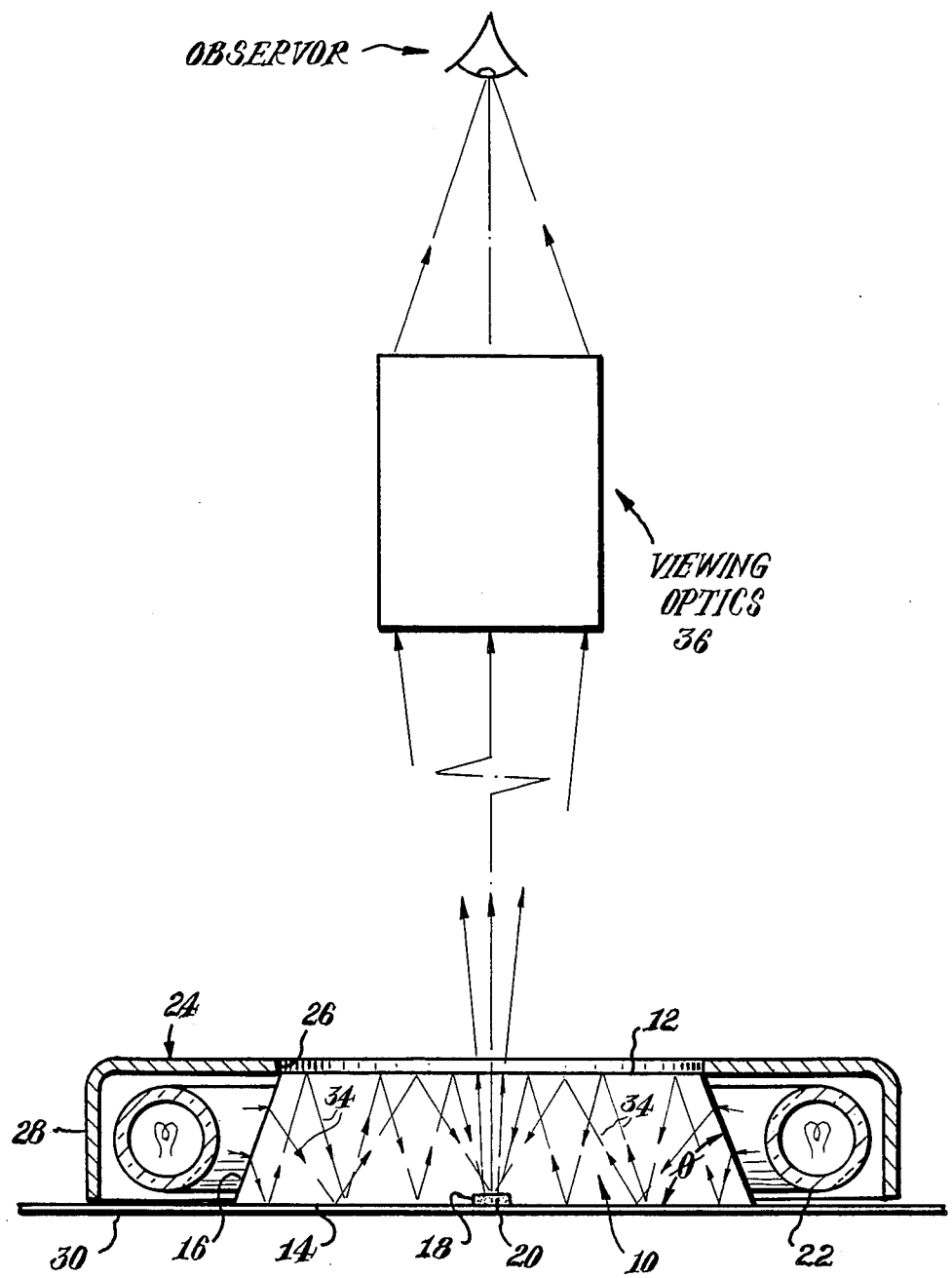
FIG. 1 is a schematic diagram of the optical layout of an instrument utilizing the preferred embodiment of the reticle according to the principles of the present invention.

A reticle plate 10 is shown in FIG. 1 which is constructed of an optically clear material, such as glass or plastic. The reticle plate 10 has a top surface 12, a scratch resistant bottom surface 14 and bevelled edge surface 16, all of which are polished. A recess 18 having a particularly shaped pattern, is formed, by any convenient manner, in bottom surface 14. A substance 20, such as ink or paint, which has the capability of fluorescing when activated by a particular type of light, such as fluorescent, ultraviolet, etc. is deposited in the recess 18.

An illuminator 22, such as a circular fluorescent lamp commercially available from Aristo, is mounted in cooperation with reticle plate 10 adjacent edge surface 16. An occluder 24 is mounted, by any convenient manner, in juxtaposition to illuminator 22 and reticle plate 10. The occluder 24 is configured to overlay the illuminator 22 and have an aperture 26 which is substantially identical in shape as the boundary of the upper surface 12, although the aperture 26 may be smaller in diameter. The occluder 24 may include a skirt portion 28 such that the illuminator 22 is positioned between the skirt 28 and the edge surface 16 of reticle 10.

In operation, reticle plate 10 would be initially positioned over the appropriate area of an object being viewed on an aerial photograph 30. The illuminator 22, which is electrically connected to any appropriate source (not shown) by electrodes 32, is then energized. The fluorescent substance 20, until activated by illuminator 22, appears to be dark and/or opaque in the operator's field of view. However, the particular characteristics of the illuminator 22 are closely matched to the characteristics of the substance 20, or vice versa, so that after entering the reticle plate 10 through bevelled edge surface 16 which has been polished to increase light transmission, the light rays 34 are of the appropriate wavelength to cause the substance 20 to fluoresce. Additionally, the angle "$\phi$" of the bevelled edge surface 16 relative to bottom surface 14 has been selected to coincide with the index of refraction of the material of plate 10 so that the light rays 34 are refracted from the edge surface 16 and bounce between top surface 12 and bottom surface 14, utilizing the principle of total internal reflection. However, a sufficient number of the light rays 34 refracted within the reticle plate 10 strike the substance 20 and cause it to fluoresce and, thus, to make the pattern visible to the operator. The remaining light rays continue to bounce harmlessly between surfaces 12 and 14, respectively. Except for a portion of those which strike substance 20, essentially none of the light rays exit the reticle plate 10 at such an angle as to permit them to enter the viewing optics 36 of the particular instrument involved. As stated earlier, both the top surface 12 and bottom surface 14 are polished. This is done to retain the quality of the image being viewed by the operator.

Once the substance 20 has been fluoresced, reticle pattern 18 is quite easily identified in the field of view by the operator, who will, in turn, move the reticle plate 10 about until the pattern 18 is exactly positioned over the desired object being viewed on the photograph 30. To enhance the visibility of the reticle pattern 18, the color of the substance may be selected to be most easily recognizable in the field of view, once fluoresced. For instance, should the operator be examining color photos of a forest where the color would mostly be green, the color of the fluorescent substance could be selected to highly contrast with the green.

As hereinbefore described, the appropriate analysis and measurements using old and well known methods may then be achieved. If desirable, the operator may extinguish the illuminator 22 and the reticle pattern 18 would return to its original opaque and unexcited state, the source of photo illumination would then be provided by the background lighting of the instrument itself, which is generally known as transillumination.

It will be evident that occluder 24 is positioned to prevent light emitted by illuminator 22 from directly entering the viewing optics 36 of the particular instrument being used. Since this would be confusing to the operator as well as detrimental to the quality of the object being viewed. Although generally not needed, skirt portion 28 may be incorporated on occluder 24 to block light from exiting peripherally outward from the illuminator 22.

Figure 2:
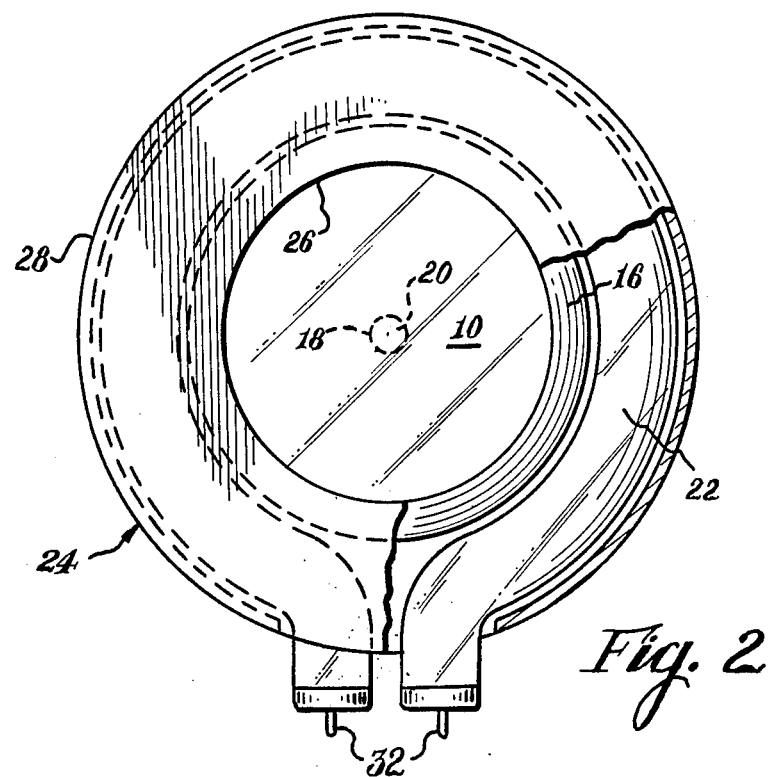
FIG. 2 is a partially broken away plan view of the reticle of FIG. 1.
Figure 3:
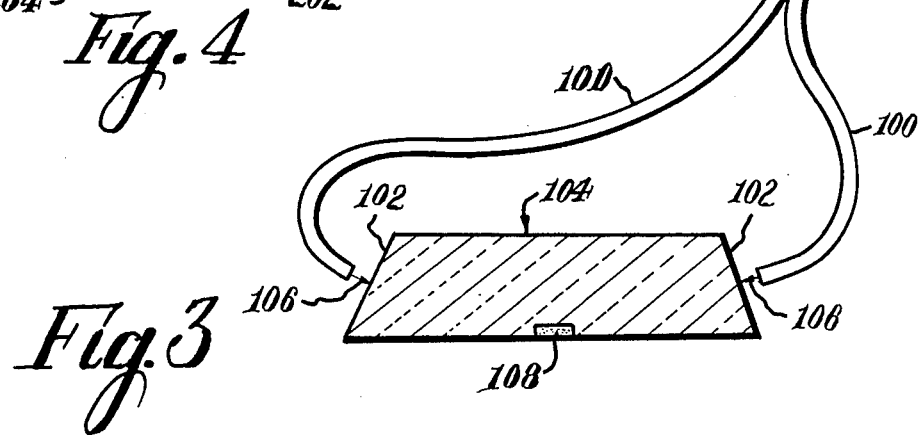

In the embodiment of FIG. 3, a plurality of fiber optic bundles 100 are mounted in juxtaposition to bevelled and polished edge surface 102 of reticle plate 104. A source of light 104 is remotely mounted to any convenient position on the instrument itself. Once energized, the light source 104 passes light 106 through the fiber optic bundles 100 and to the polished and bevelled edge surface 102. Similar to the above application, light 106 is totally internally reflected within the reticle plate 104 with a sufficient number of the rays striking the substance 108 to cause it to fluoresce. It will be appreciated that the shape of the reticle plate 104 may be something other than round, such as is shown in the embodiment of FIGS. 1 and 2. For instance, the reticle plate may be square or rectangular and the fiber optic bundles positioned so as to provide the illumination necessary to fully illuminate and activate the fluorescent substance 108 contained in the pattern.

Figure 4:
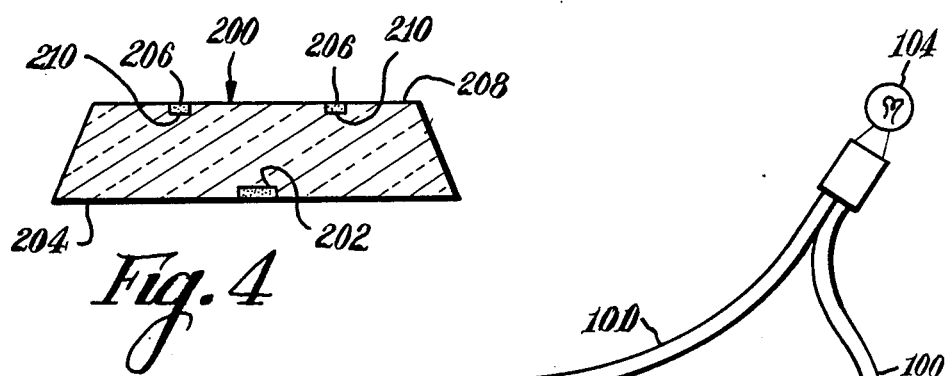
FIGS. 3 and 4 are schematic diagrams of alternative embodiments of the present invention.

In a further embodiment shown in FIG. 4, a reticle plate 200 includes a normal opaque reticle pattern 202 inscribed on bottom surface 204. However, a second pattern 206 is formed on upper surface 208 which is treated with a fluorescent substance 210. The substance 210 is activated by light rays striking it in a similar manner to the embodiments described above. The pattern 206, once fluoresced, will appear to form a border, or immediately identifiable reference image with respect to the lower opaque reticle 202. Thus, the operator may quickly and easily determine exactly where the opaque reticle 202 is in the field of view as it has been highlighted by the fluorescent pattern 206. As a further identifying aid, the two reticle patterns 202 and 206 could be of different colors. Also, if desirable, once the opaque reticle pattern 202 has been located, the source of illumination for fluorescing the substance 210 could be extinguished. Thereafter, only the opaque pattern 202 would be visible in the operator's field of view.

It should be understood that although only certain forms and embodiments of the present invention have been shown and described in detail, other forms and arrangements are possible. It is anticipated that changes and substitutions may be made thereto without departing from the spirit of the invention as defined in the appended claims.

I claim:

1. In an optical instrument having a viewing system for viewing photographic film and a referencing assembly for assisting in location of specific points upon the film being viewed, said referencing assembly comprising:
    (a) a reticle plate positioned so as to be in close proximity to the film being viewed by the optical instrument, said reticle plate being constructed to totally internally reflect light emitted by a preselected source of illumination, said reticle plate including a reticle pattern thereon which is highly fluorescent when activated by light emitted by a preselected source of illumination;
    (b) a source of illumination having predetermined lightwave characteristics, said source being mounted with respect to said reticle plate such that, when energized, light rays emitted therefrom enter and are totally internally reflected within said reticle plate and at least a portion of the totally internally reflected light rays strike and fluoresce said reticle pattern thereby causing said reticle pattern to become highly visible in the viewing system of the optical instrument; and
    (c) means cooperative with said source of illumination for substantially blocking non-refracted illumination emitted by said source of illumination in its energized mode from entering the viewing system of the optical instrument.

2. The instrument according to claim 1, wherein said blocking means comprises an occluder positioned between said source of illumination and the viewing optics.

3. The instrument according to claim 2, wherein said occluder includes a skirt member for substantially preventing illumination from escaping from said source of illumination peripherally of said reticle plate.

4. The instrument according to claim 1, wherein said reticle plate is circular and said source of illumination is a ring lamp substantially sized to fit about and be juxtaposed to the periphery of said reticle plate.

5. The instrument according to claim 1, wherein said reticle plate has a top, a bottom and an edge surface and said edge surface has defined thereon means for refracting illumination at said edge surface at an optimum angle to said top and bottom surfaces such that illumination reflected between said top and bottom surfaces is directed toward and strikes said reticle pattern.

6. The instrument according to claim 1, wherein said source of illumination is remotely mounted with respect to said reticle plate and illumination therefrom is transmitted to said reticle plate and pattern via fiber optic cables, the ends of which are in close proximity to said reticle plate.

7. The instrument according to claim 1, wherein said reticle plate has top and bottom surfaces and said reticle pattern is formed on said top surface, and further including a second reticle pattern formed on said bottom surface, said first reticle pattern fluorescing and said second reticle pattern remaining inactive when contacted by illumination from said source of illumination, said first reticle pattern thereby providing a reference image to aid in locating said second reticle pattern.

8. The instrument according to claim 1, wherein said reticle plate is scratch-resistant.

9. The instrument according to claim 1, wherein said reticle plate has top, bottom and edge surfaces, and wherein the orientation of said source of illumination to said edge surface is such that a portion of the illumination is totally internally reflected between said top and bottom surfaces to strike said reticle pattern before being refracted through said top surface into the viewing optics.

10. The instrument according to claim 9, wherein said edge surface is bevelled.

* * * * *